United States Patent [19]

Wentworth

[11] 4,257,175

[45] Mar. 24, 1981

[54] MATHEMATICAL APPARATUS

[76] Inventor: Roland A. L. Wentworth, 1 Earis Ter., London W8 6LP, England

[21] Appl. No.: 41,353

[22] Filed: May 22, 1979

[30] Foreign Application Priority Data

May 23, 1978 [GB] United Kingdom ............ 21521/78

[51] Int. Cl.³ .......................................... G09B 23/04
[52] U.S. Cl. ................................................. 434/208
[58] Field of Search ............... 35/30, 31 G, 34, 72, 35/31 D, 31F

[56] References Cited

U.S. PATENT DOCUMENTS

| 1,471,437 | 10/1923 | Wood | 35/72 |
| 3,208,162 | 9/1965 | Wisdom | 35/72 X |

FOREIGN PATENT DOCUMENTS

| 1031507 | 3/1953 | France | 35/72 |
| 1525736 | 4/1968 | France | 35/72 |

OTHER PUBLICATIONS

Cleo Learning Aids Catalog, Feb. 1976, pp. 39, 82, 102 only, items 1D7566, 1D3600, 6200.
Welch Sci. Co. Catalog 1965, Decimeter Cube p. 39.

Primary Examiner—Harland S. Skogquist
Attorney, Agent, or Firm—Nolte and Nolte

[57] ABSTRACT

A mathematics teaching apparatus comprises at least one set of rectanguloid elements of different shapes and of dimensions equal to 1, 3, 5 and 7 times a common unit or module. The set comprises a plurality of cubic blocks having an edge length equal to 1 unit, bars of unit width and thickness and lengths equal to 3, 5 and 7 units, square slabs of unit thickness and side lengths equal to 3, 5 and 7 units and rectangular slabs of unit thickness and side length combinations 3×5 units, 3×7 units and 5×7 units. Preferably the apparatus comprises two or more such sets which differ in color. The apparatus is useful for demonstrating and explaining various fundamental algebraic formulations and processes, including the algebra of 3-dimensional figures, and mathematical expressions comprising algebraic and whole number terms.

4 Claims, 6 Drawing Figures

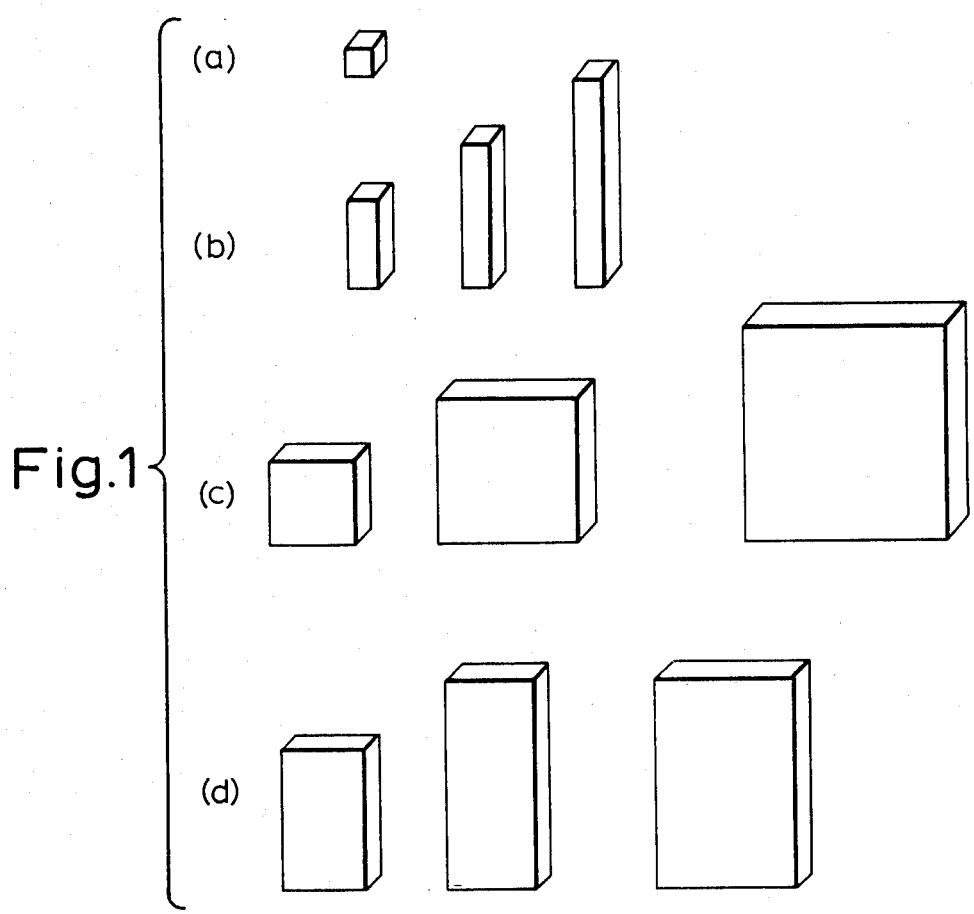
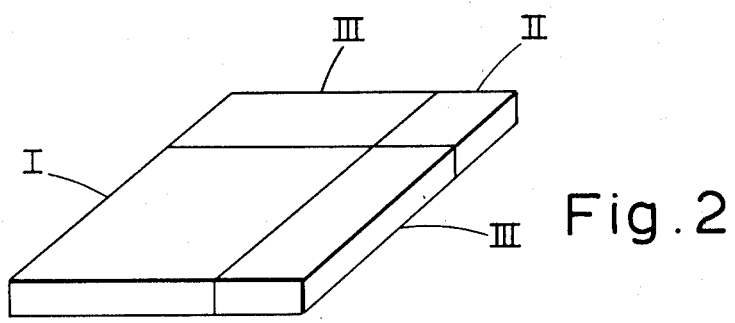

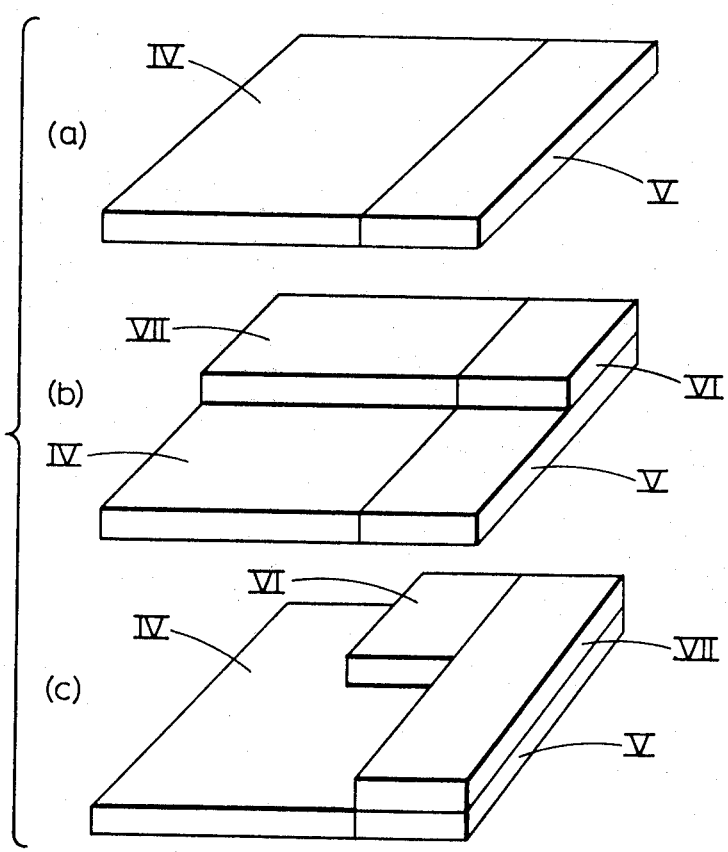
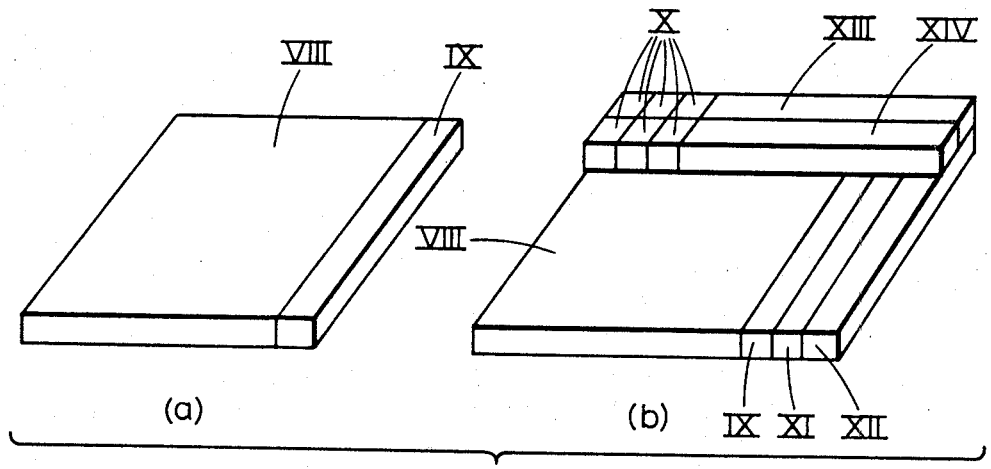

MATHEMATICAL APPARATUS

This invention relates to apparatus for use as an aid in teaching mathematics.

A methematical teaching aid is known which consists of a plurality of rectanguloid elements of each of four different sizes based on a common module, each of the three dimensions (i.e. the length, breadth and height) of each block being equal to the basic module or to ten times that module.

Such known apparatus has proved useful in providing visual aids in the teaching of arithmetical operations, more particularly those based on the decimal system.

The known apparatus is not suitable for demonstrating and explaining various fundamental algebraic formulations and processes. There is a need for an apparatus to assist such demonstration and explanation. The present invention has as its object an apparatus which fulfils that need.

Apparatus according to the invention is in the form of a kit comprising one or more sets of rectanguloid elements in the form of blocks, bars and slabs, each set incorporating:

(i) a plurality of cubic blocks (hereafter called "unit blocks") of the same size (ii) a plurality of bars each having a width and thickness each equal to the length (hereafter denoted "l") of one edge of a said unit block, there being at least one such bar of each of the lengths 3l, 5l and 7l (iii) square slabs having a thickness equal to l, there being at least one such square slab of each of the side lengths 3l, 5l and 7l (iv) rectangular slabs having a thickness equal to l, there being at least one such rectangular slab of each of the side length combinations $3l \times 5l$, $3l \times 7l$ and $5l \times 7l$.

As will hereafter be exemplified, apparatus having the features of the invention as above defined is useful for illustrating and representing a variety of algebraic formulations and processes, including the algebra of 3-dimensional figures. In virtue of the presence of the unit blocks whose edge length is a modular dimension on which the dimensions of the other rectanguloid elements are based the apparatus can be employed to give a visual representation of the analysis and development of mathematical expressions comprising algebraic and whole number terms. The prime number relationship between the different bar and slab dimensions avoids the risk which would otherwise exist that a display of elements in which two algebraic terms are represented by different bar or slab side lengths, might suggest to a pupil that one of those terms is necessarily a whole number multiple of the other.

In certain embodiments of the invention, the or each set of elements includes in addition to the elements (i), (ii), (iii) and (iv) above specified, at least one cubic block of each of the edge lengths 3l, 5l and 7l. Apparatus which includes such larger blocks can more conveniently be used in illustrating the algebra of 3-dimensional figures because some such figures can be represented by assembly of fewer elements that would otherwise be required.

Preferably the kit includes at least two and most preferably at least three sets of elements as above defined. It is very advantageous for the different sets to be of different colours.

Preferably the or each set of elements incorporates at least nine said unit blocks. Preferably the or each set incorporates at least three bars of each of said lengths 3l, 5l and 7l. The set need not incorporate the same number of bars of each of the said different lengths.

It is advantageous for the unit blocks to be 1 cm³ in size. They are in such circumstances convenient to handle and most useful for explaining and demonstrating measurements of length, area and volume using the metric system.

An example of apparatus according to the invention and various uses of it will now be described and explained with reference to the accompanying drawings. In these drawings:

FIGS. 1a to 1d represent one element of each size in the above specified categories (i) to (iv), selected from a complete kit according to the invention.

FIG. 1a shows a cubic block of arbitrary edge length, herein denoted "l". This is one of the unit blocks of the kit.

FIG. 1b shows three bars of different lengths, 3l, 5l and 7l.

FIG. 1c shows three square slabs of the three different side lengths 3l, 5l and 7l.

Figure 5:
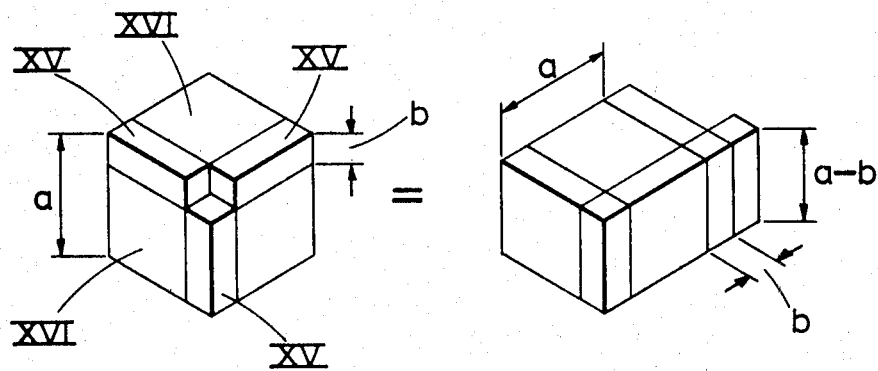

FIG. 1d shows three rectangular slabs or the three different side length combinations $3l \times 5l$, $3l \times 7l$ and $5l \times 7l$.

The bars, and the square and rectangular slabs are all of the same thickness l. The complete kit comprises three sets of elements, the sets differing in colour. One set is red, another blue and the third yellow. Each set comprises at least nine, e.g. twelve, of the said unit blocks, three bars of each of the lengths 3l and 5l, five bars of length 7l, and one of each of the different sizes of square and rectangular slabs. It is emphasised that this is an example only of the numbers of the different elements which may make up a set in apparatus according to the invention. The greater the numbers of different elements in a set the greater is the potential uses of the apparatus but the numbers present in this example are sufficient for a very versatile teaching aid.

For demonstrating algebraic formulations and processes the edge length "l" of a unit block can be taken as of unit value. The different bar lengths, and the different side lengths of the square and rectangular slabs, are whole number multiples of that unit value and are in prime number relationships. The different side lengths 3l, 5l and 7l ($=3$, 5 and 7 units) can be taken as representing abstract values denoted by algebraic symbols e.g. "a", "b" and "c". For example:

Notionally designating the side lengths 7l and 3l, as "a" and "b" respectively, square slabs I and II of side length 7l and 3l representing areas a² and b² respectively were assembled together with two rectangular slabs III of the side length combination $7l \times 3l$ (each therefore representing the area $a \times b$), to cover a large square area $(a+b) \times (a+b)$ as represented in FIG. 2. By this means the teacher can demonstrate that $a^2 + 2ab + b^2$ is equivalent to $(a+b)^2$. It is helpful if those blocks which are selected for assembly in that manner and which differ from each other in size, also differ from each other in colour.

For example blocks I and II may be selected from the set of red blocks and the set of yellow blocks respectively, and blocks III may be selected from the set of blue blocks. Of course this is not essential. Blocks I and II may be of the same colour so that only two colours are used in the assembly, or all four blocks may be of the same colour. A teaching aid kit according to the invention in which there are only two differently coloured sets of rectanguloid elements, or in which there is only one set of rectanguloid elements all of the same colour, is therefore useful for a similar purpose although less effectively.

FIG. 3 shows selected elements laid to demonstrate simplification of the expression $(a+b)(a-b)$. Taking element dimensions 7l and 3l as representing values "a" and "b" as before, first a large square element IV (side length 7l) and a rectangular slab V of side lengths 7l ($=a$) and 3l ($=b$) are laid side by side as shown in FIG. 3a to form a rectangle measuring $a\times(a+b)$ thereby demonstrating the multiplication of the first factor $(a+b)$ in the algebraic expression by the first symbol a in the second factor $(a-b)$. Now the product of the first factor and the second symbol b in the second factor is represented by the assembly of a square slab VI of side length b with a rectangular slab VII of side lengths a and b so that they together form a rectangle $b\times(a+b)$. As this product is negative in the algebraic expression the elements VI and VII are placed on top of the elements IV and V as shown in FIG. 3b. This positioning of elements VI and VII represents a deduction of their area from the area covered by the first two elements IV and V. The residual value is represented by the area covered by the exposed portions of elements IV and V. Now by rearranging the elements VI and VII into the positions shown in FIG. 3c it can be demonstrated that the residual value is in fact equal to $(a\times a)$ minus $(b\times b)=a^2-b^2$.

The demonstration of deduction by superimposition of one layer of elements on another is greatly assisted if the elements selected for the top layer are of different colours from the underlying elements. In the actual example represented by FIGS. 3a to 3c, elements IV was red, element V was yellow and elements VI and VII were blue. But of course a different colour selection can be made.

FIG. 4 shows a use of the apparatus for demonstrating the fractorisation of the expression $a^2+a-6$. From the kit, there were selected a large red square slab VIII to represent $a^2$, a long blue bar IX of a length equal to a side of that square slab to represent value $a(=a\times 1)$, and six yellow unit blocks X to represent the value 6. The object of the demonstration was to form a rectangular area with sides equal to factors of the expression to be factorised. Firstly the red square slab VIII and the blue bar IX were laid side by side as shown in FIG. 4a to represent $a^2+a$. As it was not possible to arrange the six unit blocks X on top of that combination of elements to leave a residual area of rectangular shape, four further long blue bars were laid to create an exposed area equal in magnitude to that of the combined elements VIII and IX but of different shape. Two of these further bars, XI and XII were laid alongside bar IX by way of addition to the original area and the other two of such further bars, XIII and XIV were laid on top to effect an equivalent subtraction. Finally the six unit blocks X were laid in the second layer, contiguously with the blue bars XIII and XIV, the final assembly being as represented in FIG. 4b. The dimensions of the residual area then exposed were $(a+3)\times(a-2)$, which are the factors of the initial expression.

A use of the apparatus for illustrating the algebra of 3-dimensional figures is represented in FIG. 5. The purpose is to illustrate the factorisation of $a^3-b^3$. For this purpose a notional value equal to 3 times the unit length l is ascribed to the term a while the term b is assumed to be equal to that unit length. The term $a^3$ is first represented by assembling a plurality of the bars XV of length 3l, a plurality of square slabs XVI of side length 3l, and a single unit cube to form a large cubic figure measuring $a\times a\times a=a^3$ whereafter the unit cube is removed from the assembly to represent the deduction of $b^3$, so leaving a 3-dimensional figure of volume $a^3-b^3$ as shown on the left hand side of FIG. 3. The elements in the top layer are then removed and laid alongside the elements below to form a 3-dimensional figure of height $(a-b)$ and plan area $(a^2+ab+b^2)$, the volume of that figure $(a-b)(a^2+ab+b^2)$ being equal to $a^3-b^3$.

An algebraic expression representing the cube of a trinomial, e.g. $(a+b+c)^3$, can also be demonstrated by means of the apparatus by assembling elements to form a cube each dimension of which is the sum of three different values, these three values being represented by different elements, preferably elements of different colours.

Figure 6:
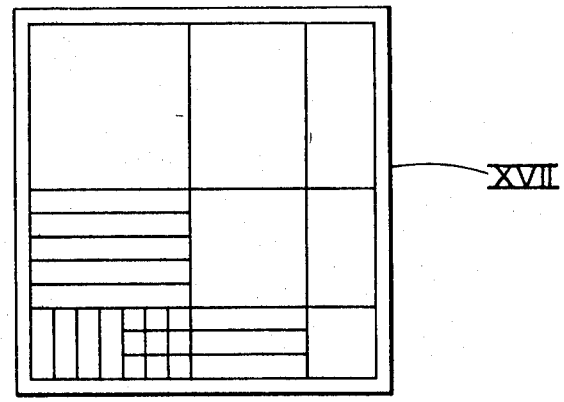

FIG. 6 shows in plan view a box XVII containing a preferred apparatus according to the invention. The box is square in plan and contains three layers of elements, each layer being composed of one set of elements. The layers are identical except for colour. The elements of each layer are the same colour which differs from the colour of the elements of each other layer. Each layer comprises nine unit blocks, four bars of length 3l, three bars of length 5l, five bars of length 7l and one each of the different sizes of square and rectangular slabs represented in FIG. 1. These elements are assembled as shown to occupy a square of the same dimensions as the interior of the box.

I claim:

1. Apparatus for use as an acid in teaching mathematics which apparatus is in the form of a kit comprising at least one set of rectanguloid elements, including:
   (i) a plurality of cubic blocks (hereafter called "unit blocks") of the same size
   (ii) a plurality of bars each having a width and thickness each equal to the length (hereafter denoted "l") of one edge of a said unit block, there being at least one such bar of each of the lengths 3l, 5l and 7l
   (iii) square slabs having a thickness equal to l, there being at least one such square slab of each of the side lengths 3l, 5l and 7l
   (iv) rectangular slabs having a thickness equal to l, there being at least one such rectangular slab of each of the side length combinations $3l\times 5l$, $3l\times 7l$ and $5l\times 7l$.

2. Apparatus according to claim 1, wherein the kit includes at least two sets of elements as defined in claim 1, the elements of the different sets differing in colour.

3. Apparatus according to claim 1, wherein said set of elements additionally includes at least one cubic block of each of the edge lengths 3l, 5l and 7l.

4. Apparatus for use as an aid in teaching mathematics which apparatus is in the form of a kit comprising at least three sets of rectanguloid elements, the elements of each set being of a colour different from the colour of the elements of each of the other sets, each set incorporating:
   (i) at least nine cubic blocks (hereafter called "unit blocks") of the same size
   (ii) a plurality of bars each having a width and thickness each equal to the length (hereafter denoted "l") of one edge of a said unit block, there being at least three bars of each of said lengths 3l, 5l and 7l (iii) square slabs having a thickness equal to l, there being at least one such square slab of each of the side lengths 3l, 5l and 7l
(iv) rectangular slabs having a thickness equal to l, there being at least one such rectangular slab of each of the side length combinations 3l×5l, 3l×7l and 5l×7l.

* * * * *

UNITED STATES PATENT AND TRADEMARK OFFICE
CERTIFICATE OF CORRECTION

PATENT NO. : 4,257,175
DATED : March 24, 1981
INVENTOR(S) : Roland Wentworth

It is certified that error appears in the above—identified patent and that said Letters Patent is hereby corrected as shown below:

Column 4, line 34, "acid" should read -- aid --.

Signed and Sealed this

Sixteenth Day of June 1981

[SEAL]

Attest:

RENE D. TEGTMEYER

Attesting Officer — Acting Commissioner of Patents and Trademarks

UNITED STATES PATENT AND TRADEMARK OFFICE
CERTIFICATE OF CORRECTION

PATENT NO. : 4,257,175
DATED : March 24, 1981
INVENTOR(S) : Roland Wentworth

It is certified that error appears in the above-identified patent and that said Letters Patent are hereby corrected as shown below:

On the title page, Item /76/, "Earis" Ter." should read -- Earls --.

Signed and Sealed this

Eleventh Day of August 1981

[SEAL]

Attest:

GERALD J. MOSSINGHOFF

Attesting Officer     Commissioner of Patents and Trademarks